United States Patent
Huang

(10) Patent No.: US 12,490,266 B2
(45) Date of Patent: Dec. 2, 2025

(54) METHOD AND APPARATUS FOR SELECTING CHANNEL OF NFC SIGNAL

(71) Applicant: Beijing Tsingteng Microsystem Co., Ltd., Beijing (CN)

(72) Inventor: Jinhuang Huang, Beijing (CN)

(73) Assignee: BEIJING TSINGTENG MICROSYSTEM CO., LTD., Beijing (CN)

( * ) Notice: Subject to any disclaimer, the term of this patent is extended or adjusted under 35 U.S.C. 154(b) by 427 days.

(21) Appl. No.: 18/082,302

(22) Filed: Dec. 15, 2022

(65) Prior Publication Data
US 2024/0072846 A1    Feb. 29, 2024

(30) Foreign Application Priority Data
Aug. 23, 2022   (CN) .......................... 202211010899.6

(51) Int. Cl.
  *H04B 5/00*    (2024.01)
  *H04B 5/70*    (2024.01)
  *H04W 72/20*   (2023.01)

(52) U.S. Cl.
  CPC ............. *H04W 72/20* (2023.01); *H04B 5/70* (2024.01)

(58) Field of Classification Search
  CPC .......... H04B 5/00; H04B 5/72; H04B 5/0031; H04B 72/20
  See application file for complete search history.

(56) References Cited

U.S. PATENT DOCUMENTS

| 5,553,081 A | 9/1996 | Downey |
| 8,073,082 B2 * | 12/2011 | Matsuo ................... H04L 27/38 375/340 |
| 2009/0097594 A1 | 4/2009 | Matsuo |

FOREIGN PATENT DOCUMENTS

CN    114266264 A    4/2022

OTHER PUBLICATIONS

Extended European Search Report for EP Application No. 22212394.5, dated Aug. 14, 2023; 7 pages.

* cited by examiner

*Primary Examiner* — Tuan H Nguyen
(74) *Attorney, Agent, or Firm* — Schwabe, Williamson & Wyatt, P.C.

(57) ABSTRACT

A method and apparatus for selecting a channel of an NFC signal are provided. The method includes: determining first and second envelope signals respectively according to an I-channel signal and a Q-channel signal in the NFC signal, determining a first reference point and a first demodulation threshold corresponding to the first reference point according to the first envelope signal, determining a second reference point and a second demodulation threshold corresponding to the second reference point according to the second envelope signal, determining first and second bit count values by performing first and second bits count respectively on the first and second envelope signals, and determining a target-channel signal from the I-channel signal and the Q-channel signal according to the first and second bit count values, if the first or second bit count value reaches a preset bits threshold.

19 Claims, 3 Drawing Sheets

METHOD AND APPARATUS FOR SELECTING CHANNEL OF NFC SIGNAL

CROSS-REFERENCE TO RELATED APPLICATIONS

This application claims benefit of priority to Chinese patent application NO. 202211010899.6, titled "METHOD AND APPARATUS FOR SELECTING CHANNEL OF NFC SIGNAL", filed Aug. 23, 2022, with the China National Intellectual Property Administration, which is incorporated herein by reference in its entirety.

FIELD

The present disclosure relates to the technical field of communications, and in particular to a method and an apparatus for selecting a channel of an NFC signal.

BACKGROUND

Near Field Communication (abbreviated as NFC) is a short-range wireless communication technology, which can realize non-contact point-to-point data transmission between electronic devices. The NFC communication is widely used at present.

In the existing technology, an NFC signal is generally sampled by a digital-to-analog converter (ADC) to form two channel signals that are orthogonal to each other. A corresponding receiver locks, with a phase-locked loop, one of the channel signals which carries data of value. Thus, in the subsequent communication process, only the locked channel signal is processed, instead of processing both the signals, which reduces the computation and the power consumption.

In practice, in the application environment of the NFC communication, the NFC communication is highly subject to various types of interference, which leads to the "loss of lock" of the phase-locked loop. In this case the receiver is difficult to complete the channel selection accurately. On the other hand, if both the channel signals are processed, it will increase the computation and the power consumption inevitably.

SUMMARY

A method and an apparatus for selecting a channel of an NFC signal are provided according to the present disclosure, to more accurately select a channel of the NFC signal.

In a first aspect, a method for selecting a channel of an NFC signal is provided according to the present disclosure. The method includes:
  determining a first envelope signal according to an I-channel signal in the NFC signal,
  determining a second envelope signal according to a Q-channel signal in the NFC signal,
  determining a first reference point and a first demodulation threshold corresponding to the first reference point according to the first envelope signal,
  determining a second reference point and a second demodulation threshold corresponding to the second reference point according to the second envelope signal,
  performing a first bits count on the first envelope signal based on the first reference point and the first demodulation threshold to determine a first bit count value,
  performing a second bits count on the second envelope signal based on the second reference point and the second demodulation threshold to determine a second bit count value, and
  determining a target-channel signal from the I-channel signal and the Q-channel signal according to the first bit count value and the second bit count value, in a case that the first bit count value or the second bit count value reaches a preset bits threshold.

In an embodiment, determining the first reference point according to the first envelope signal and determining the second reference point according to the second envelope signal include:
  determining EnvI(T1) as an amplitude of the first reference point in a case that EnvI(T1)≥EnvI(T1+1), EnvI(T1)>EnvI(T1+2), EnvI(T1)>EnvI(T1+3) and EnvI(T1)>THIsoc, where EnvI represents the first envelope signal, T1 represents a time instant T1 in the first envelope signal, and THIsoc represents a preset first detection threshold, and
  determining EnvQ(T2) as an amplitude of the second reference point in a case that EnvQ(T2)≥EnvQ(T2+1), EnvQ(T2)>EnvQ(T2+2), EnvQ(T2)>EnvQ(T2+3) and EnvQ(T2)>THQsoc, where EnvQ represents the second envelope signal, T2 represents a time instant T2 in the second envelope signal, and THQsoc represents a preset second detection threshold.

In an embodiment, determining the first demodulation threshold corresponding to the first reference point and determining the second demodulation threshold corresponding to the second reference point include:
  determining IThm=α*EnvI(T1) and QThm=α*EnvQ(T2), where IThm represents the first demodulation threshold, QThm represents the second demodulation threshold, and a represents a preset demodulation coefficient, and
  determining IThe=β*EnvI(T1) and QThe=β*EnvQ(T2), where IThe represents a first amplitude threshold, QThe represents a second amplitude threshold, and R represents a preset amplitude coefficient.

In an embodiment, performing the first bits count on the first envelope signal based on the first reference point and the first demodulation threshold to determine the first bit count value includes:
  performing a loop count on the first envelope signal based on the first reference point,
  determining a first sampling amplitude and a second sampling amplitude of the first envelope signal according to the loop count, and
  incrementing the first bit count value of the first envelope signal once, in a case that an absolute value of a difference between the first sampling amplitude and the second sampling amplitude is greater than the first demodulation threshold and the first sampling amplitude or the second sampling amplitude is greater than the first amplitude threshold.

In an embodiment, performing the second bits count on the second envelope signal based on the second reference point and the second demodulation threshold to determine the second bit count value includes:
  performing a loop count on the second envelope signal based on the second reference point,
  determining a third sampling amplitude and a fourth sampling amplitude of the second envelope signal according to the loop count, and
  incrementing the second bit count value of the second envelope signal once, in a case that an absolute value of a difference between the third sampling amplitude and the fourth sampling amplitude is greater than the second demodulation threshold and the third sampling amplitude or the fourth sampling amplitude is greater than the second amplitude threshold.

In an embodiment, determining the target-channel signal from the I-channel signal and the Q-channel signal according to the first bit count value and the second bit count value includes:

determining the I-channel signal as the target-channel signal in a case that Ib>Qb+1, and determining the Q-channel signal as the target-channel signal in a case that Qb>Ib+1, where Ib represents the first bit count value, and Qb represents the second bit count value.

In an embodiment, determining the target-channel signal from the I-channel signal and the Q-channel signal according to the first bit count value and the second bit count value includes:

determining the target-channel signal according to the amplitude of the first reference point and the amplitude of the second reference point, in a case that Ib=Qb, Ib=Qb+1 or Ib+1=Qb.

In an embodiment, determining the target-channel signal from the I-channel signal and the Q-channel signal according to the first bit count value and the second bit count value includes:

determining the target-channel signal according to a signal-to-noise ratio of the first reference point and a signal-to-noise ratio of the second reference point, in a case that Ib=Qb, Ib=Qb+1 or Ib+1=Qb.

In a second aspect, an electronic device is provided according to the present disclosure. The electronic device includes a processor and a memory with executable instructions stored thereon. The processor is configured to perform the method in the first aspect by executing the executable instructions.

In a third aspect, a computer readable storage medium with executable instructions stored thereon is provided according to the present disclosure. The executable instructions, when executed by a processor, cause the processor to perform the method in the first aspect.

A method and an apparatus for selecting a channel of an NFC signal are provided according to the present disclosure. The novel channel selection method for an NFC signal can realize the channel selection of NFC signal more accurately and avoid the influence of various interference factors. In addition, processing of the signals on both the channels is circumvented, thereby avoiding extra computation and power consumption.

BRIEF DESCRIPTION OF THE DRAWINGS

In order to more clearly explain the embodiments of the present disclosure or the conventional technology, the accompanying drawings referred to for describing the embodiments or the conventional technology are briefly described hereinafter. Apparently, the accompanying drawings in the following description are only some embodiments of the present disclosure. Other drawings may be obtained by those of ordinary skill in the art based on the provided drawings without any inventive efforts.

DETAILED DESCRIPTION

To make the purpose, technical solutions and beneficial effects more clear, the technical solutions in the embodiments of the present disclosure will be clearly and completely described hereinafter with reference to the drawings in the embodiments according to the present disclosure. It is apparent that the described embodiments are only some rather than all the embodiments of the present disclosure. All other embodiments, obtained by those skilled in the art based on the embodiments in the present disclosure without any creative work, fall within the scope of protection of the present disclosure.

In the existing technology, an NFC signal is generally sampled by a digital-to-analog converter (ADC) to form two channel signals that are orthogonal to each other, which are the so-called I-channel signal and Q-channel signal in the art. A corresponding receiver locks, with a phase-locked loop, one of the channel signals which carries data of value. Thus, in the subsequent communication process, only the locked channel signal is processed, instead of processing both the signals, which reduces the computation and the power consumption.

In practice, in the application environment of the NFC communication, the NFC communication is highly subject to various types of interference, which leads to the "loss of lock" of the phase-locked loop. In this case the receiver is difficult to complete the channel selection accurately. If both the channel signals are processed, it will increase the computation and the power consumption inevitably. There is a lack of a channel selection solution that can address the issues above.

Figure 1:
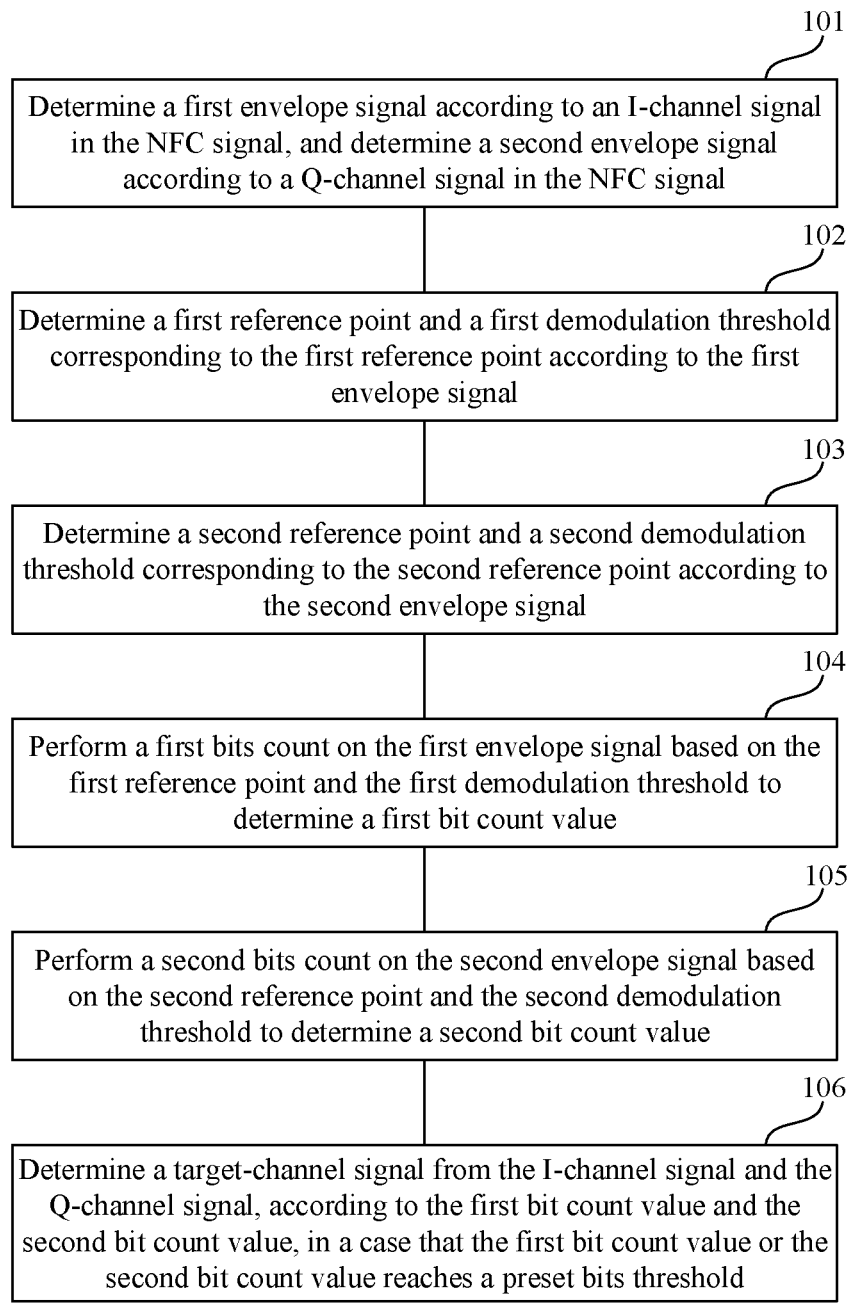
FIG. 1 is a flowchart of a method for selecting a channel of an NFC signal according to an embodiment of the present disclosure.

In view of this, a method for selecting a channel of an NFC signal is provided according to the present disclosure. Reference is made to FIG. 1, which shows a method for selecting a channel of an NFC signal according to an embodiment of the present disclosure. In this embodiment, the method includes following steps 101 to 106.

In step 101, a first envelope signal is determined according to an I-channel signal in the NFC signal, and a second envelope signal is determined according to a Q-channel signal in the NFC signal.

In the embodiment, after the NFC signal is collected, two signals that are orthogonal to each other may be generated by an existing method, that is, an I-channel signal and a Q-channel signal. For example, the NFC signal may be amplified, and out-of-band interference and noise are suppressed to improve signal quality; and the I-channel signal and the Q-channel signal are generated by orthogonal down-conversion and phase locking. In an embodiment, out-of-band interference and noise may also be suppressed for the I-channel signal and the Q-channel signal, thereby improving signal quality.

The I-channel signal may be expressed as SI(i) and the Q-channel signal may be expressed as SQ(i), where i is a positive integer.

After the I-channel signal and the Q-channel signal are determined, their respective envelope signals may be determined. In an embodiment, a correlation computation may be performed on a reference signal and the I-channel signal, to determining a corresponding first envelope signal, and a correlation computation may be performed on the reference signal and the Q-channel signal to determine a corresponding second envelope signal. For example, the reference signal may be a subcarrier with a frequency of 848 KHz, and a sampling frequency is 13.56 MHz. The reference signal is a 16-bit signal, which can be expressed as ref=[−1 −1 −1 −1 −1 −1 −1 −1 1 1 1 1 1 1 1 1].

A first correlation result CorI(i)=sum (SI(i, i+1, . . . , i+15)*ref) for the I-channel signal and a second correlation result CorQ(i)=sum (SQ(i, i+1, . . . , i+15)*ref) for the Q-channel signal can be obtained by the computations. Then an absolute value of the first correlation result is taken to obtain the first envelope signal, which is expressed as EnvI or EnvI(i). An absolute value of the second correlation result is taken to obtain the second envelope signal, which is expressed as EnvQ or EnvQ(i). In fact, EnvI(i) and EnvQ(i) can be considered as functions in a rectangular coordinate system, where i is a variable of function. In the rectangular coordinate system, the abscissa represents time and the ordinate represents an amplitude of an envelope signal.

In step 102, a first reference point and a first demodulation threshold corresponding to the first reference point are determined according to the first envelope signal.

After determining the first envelope signal, a first reference point may be determined in the first envelope signal. The so-called first reference point may be considered as an "inflection point" in the first envelope signal.

In an embodiment, in a case that a certain time instant T1 in the first envelope signal satisfies all of EnvI(T1)>EnvI(T1+1), EnvI(T1)>EnvI(T1+2), EnvI(T1)>EnvI(T1+3) and EnvI(T1)>THIsoc, EnvI(T1) is determined as an amplitude of the first reference point (i.e., ordinate); T1 is a time instant (i.e., abscissa) corresponding to the first reference point. In this way, the complete coordinates of the first reference point in the rectangular coordinate system are determined. T1+1, T1+2 and T1+3 respectively represent time instants 1 time unit, 2 time units and 3 time units after T1, and THIsoc represents a preset first detection threshold.

In an embodiment, the first detection threshold THIsoc may be preset based on an experimental result. After the amplitude EnvI(T1) of the first reference point is determined, a numerical relationship between EnvI(T1) and the first detection threshold THIsoc may be determined. If EnvI(T1)>THIsoc, EnvI(T1) may be determined as an estimated amplitude in the first envelope signal. Then the first demodulation threshold is determined according to the estimated amplitude, that is, IThm=α*EnvI(T1), where IThm represents the first demodulation threshold, and α represents a preset demodulation coefficient.

In addition, after EnvI(T1) is determined as the estimated amplitude in the first envelope signal, a first amplitude threshold IThe=β*EnvI(T1) may also be determined, where IThe represents the first amplitude threshold, and β represents a preset amplitude coefficient.

In step 103, a second reference point and a second demodulation threshold corresponding to the second reference point are determined according to the second envelope signal.

Similar to the step 102, a second reference point and a second demodulation threshold can be determined according to the second envelope signal.

That is, in a case that a certain time instant T2 in the second envelope signal satisfies all of EnvQ(T2)>EnvQ(T2+1), EnvQ(T2)>EnvQ(T2+2), EnvQ(T2)>EnvQ(T2+3) and EnvQ(T2)>THQsoc, EnvQ(T2) is determined as an amplitude (i.e., ordinate) of the second reference point; t2 is a time instant (i.e., abscissa) corresponding to the second reference point. In this way, the complete coordinates of the second reference point in the rectangular coordinate system are determined. T2+1, T2+2 and T2+3 represent respectively represent time instants 1 time unit, 2 time units and 3 time units after T2, and THQsoc represents a preset second detection threshold.

In an embodiment, the second detection threshold THQsoc is preset based on an experimental result. A numerical relationship between EnvQ(T2) and the second detection threshold THQsoc is determined. If EnvQ(T2)>THQsoc, EnvQ(T2) may be determined as an estimated amplitude in the second envelope signal. Then the second demodulation threshold is determined according to the estimated amplitude, that is QThm=α*EnvQ(T2), where QThm represents the second demodulation threshold, and α represents the preset demodulation coefficient.

In addition, after EnvQ(T2) is determined as the estimated amplitude in the second envelope signal, a second amplitude threshold QThe=β*EnvQ(T2) may also be determined, where QThe represents the second amplitude threshold, and β represents the preset amplitude coefficient.

In step 104, a first bit count value is determined by performing a first bits count on the first envelope signal based on the first reference point and the first demodulation threshold.

The first bit count value is a value of the first bits count. In an embodiment, a loop count may be performed on the first envelope signal based on the first reference point. That is, a loop counter is started with the abscissa T1 of the first reference point as the starting point. In a case that a sampling frequency of the loop counter is 13.56 MHz, the loop counter will perform a loop count between 128 integer values from 0 to 127. An initial value corresponding to T1 may be 63, and subsequent loop count is performed along the horizontal axis of the rectangular coordinate system.

A first sampling amplitude and a second sampling amplitude of the first envelope signal may be determined according to the loop count. The first sampling amplitude corresponds to an amplitude of the first envelope signal when a value of the loop counter is 63. The second sampling amplitude corresponds to an amplitude of the first envelope signal when the value of the loop counter is 127. Thus, the first sampling amplitude and the second sampling amplitude represent amplitudes of a first half and a second half of a period of the first envelope signal, respectively.

Generally, one half of a period of the first envelope signal is a valid signal, and the other half is an invalid signal, where an amplitude corresponding to the valid signal is significantly greater than an amplitude corresponding to the invalid signal. In other words, an absolute value of a difference between the first and second sampling amplitudes should theoretically be greater than a certain threshold. In the embodiment, the first demodulation threshold may be determined as the threshold.

In addition, if at least one of the first sampling amplitude and the second sampling amplitude is greater than the first amplitude threshold, part of the first envelope signal in this period may be considered as valid. Otherwise, if neither of the first sampling amplitude and the second sampling amplitude is greater than the first amplitude threshold, strength of the signal is considered low and the signal is hence invalid.

That is to say, in a case that the absolute value of the difference between the first sampling amplitude and the second sampling amplitude is greater than the first demodulation threshold, and the first sampling amplitude or the second sampling amplitude is greater than the first amplitude threshold, an amplitude of the first envelope signal in this period may be considered normal. In this case, one time of incrementing may be performed on the first bit count value of the first envelope signal.

The incrementing of the first bit count value is one time of bits count on the first envelope signal. A bit counter for the bits count is a separate counter. The first bit count value of the first envelope signal starts at 0. When the above conditions are satisfied and the first bit count value is incremented, the first bit count value of the first envelope signal is increased by 1, and so on and so forth. Conversely, if the above conditions are not satisfied in a certain period of the first envelope signal, the first bit count value will not be increased.

In step 105, a second bit count value is determined by performing a second bits count on the second envelope signal based on the second reference point and the second demodulation threshold.

The second bit count value is a value of the second bits count. This step is similar to the above step 104, which includes performing a loop count on the second envelope signal based on the second reference point and determining a third sampling amplitude and a fourth sampling amplitude of the second envelope signal according to the loop count. The third sampling amplitude corresponds to an amplitude of the second envelope signal when a value of the loop counter is 63. The fourth sampling amplitude corresponds to an amplitude of the second envelope signal when the value of the loop counter is 127. When an absolute value of a difference between the third sampling amplitude and the fourth sampling amplitude is greater than the second demodulation threshold, and the third sampling amplitude or the fourth sampling amplitude is greater than the second amplitude threshold, one time of incrementing may be performed on the second bit count value of the second envelope signal.

In step 106, a target-channel signal is determined from the I-channel signal and the Q-channel signal, according to the first bit count value and the second bit count value, in a case that the first bit count value or the second bit count value reaches a preset bits threshold.

In an embodiment, a bits threshold may be preset, which is usually an integer value; for example, the bits threshold B may be set to 3 in an embodiment. Further, the first bit count value and the second bit count value may be compared with the bits threshold, to determine whether the first bit count value or the second bit count value reaches the bits threshold. In an embodiment, it is determined which of the first bit count value and the second bit count value reaches the bits threshold first.

The first bit count value and the second bit count value represent the numbers of normal signal periods in the first envelope signal and the second envelope signal. If the signal quality is poor and there are many abnormal periods, the bit count value will be incremented slowly. If a signal strength is low, an amplitude of the inflection point (the first reference point or the second reference point) reaches the first detection threshold or the second detection threshold late, which leads to slower growth of the bit count values. Therefore, logically, a signal quality of a signal with the higher bit count value is also higher. Therefore, after either of the two bit count values reaches the bits threshold, a channel may be selected according to a specific selection mechanism in the embodiment, to determine a target-channel signal from the I-channel signal and the Q-channel signal.

For example, in some cases, a signal on a channel corresponding to the bit count value that first reaches the bits threshold may be selected as the target-channel signal. That is, if the first bit count value reaches the bits threshold first, the I-channel signal is selected as the target-channel signal; or if the second bit count value reaches the bits threshold first, the Q-channel signal is selected as the target-channel signal.

Other selection mechanisms may alternatively be used. For example, a numerical relationship between the first and second bit count values may further be determined after any of the first and second bit count values reaches the bits threshold. The I-channel signal is determined as the target-channel signal in case of $Ib>Qb+1$, and the Q-channel signal is determined as the target-channel signal in case of $Qb>Ib+1$, where $Ib$ represents the first bit count value, and $Qb$ represents the second bit count value.

The beneficial effects according to the above technical solution in the embodiment are as follows. A novel channel selection method for an NFC signal is provided, which can realize the channel selection of NFC signal more accurately and avoid the influence of various interference factors. In addition, processing of both the channel signals is circumvented, thereby avoiding extra computation and power consumption.

FIG. 1 shows a fundamental embodiment of the method in the present disclosure, and other preferable embodiments can be obtained based on the embodiment shown in FIG. 1.

Figure 2:
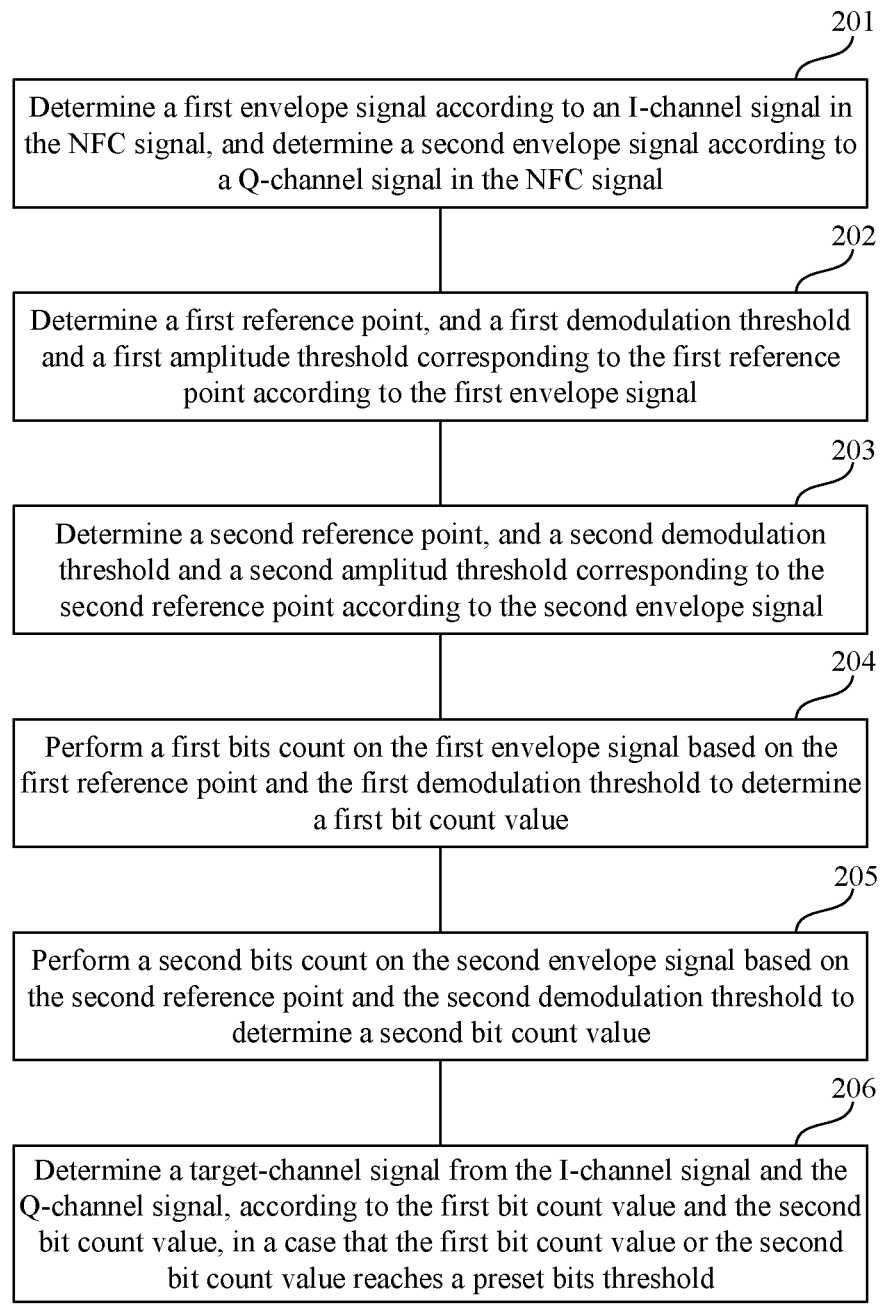
FIG. 2 is a flowchart of another method for selecting a channel of an NFC signal according to an embodiment of the present disclosure.

As shown in FIG. 2, a method for selecting a channel of an NFC signal is provided according to an embodiment of the present disclosure. The embodiment is described on the basis of the foregoing embodiment. In the embodiment, the method includes the following steps 201 to 206.

In step 201, a first envelope signal is determined according to an I-channel signal in the NFC signal, and a second envelope signal is determined according to a Q-channel signal in the NFC signal.

In step 202, a first reference point, and a first demodulation threshold and a first amplitude threshold corresponding to the first reference point are determined according to the first envelope signal.

In step 203, a second reference point, and a second demodulation threshold and a second amplitude threshold corresponding to the second reference point are determined according to the second envelope signal.

The steps 201 to 203 are substantially consistent with steps 101 to 103 of the foregoing embodiments, and reference may be made to the foregoing embodiments for detailed implementation of the steps 201 to 203, which thus are not repeated herein.

In step 204, a first bit count value is determined by performing a first bits count on the first envelope signal based on the first reference point and the first demodulation threshold.

In this step, a loop count is performed on the first envelope signal based on the first reference point, to determine a first sampling amplitude and a second sampling amplitude of the first envelope signal. The first sampling amplitude and the second sampling amplitude represent amplitudes of a first half and a second half of a period of the first envelope signal, respectively. Reference may be made to the foregoing embodiments for details of the above, which are not repeated herein for brevity.

Theoretically, an absolute value of a difference between the first sampling amplitude and the second sampling amplitude should be greater than the first demodulation threshold IThm, and at least one of the first sampling amplitude and the second sampling amplitude should be greater than the first amplitude threshold IThe. In this case, part of the first envelope signal in this period may be considered as valid.

In the above loop count, if the absolute value of the difference between the first sampling amplitude and the second sampling amplitude is not greater than the first demodulation threshold IThm, or if neither of the first sampling amplitude and the second sampling amplitude is greater than the first amplitude threshold IThe, the loop count will proceed to exception handling. After proceeding to exception handling, resetting is performed for the first envelope signal of the I-channel signal, that is, the first reference point, the first demodulation threshold, and the first amplitude threshold are recalculated, and the loop count and the bits count are re-performed.

In case of not proceeding to the exception handling, a bits count is performed on the first envelope signal, and the bit count value thereof is incremented.

In step 205, a second bit count value is determined by performing a second bits count on the second envelope signal based on the second reference point and the second demodulation threshold.

In this step, a loop count is performed on the second envelope signal based on the second reference point to determine a third sampling amplitude and a fourth sampling amplitude of the second envelope signal. Then, in the same way as in the step 204, it is determined according to the third sampling amplitude and the fourth sampling amplitude whether to proceed to exception handling. In case of determination of proceeding to the exception handling, resetting may be performed for the second envelope signal of the Q-channel signal. In case of not proceeding to the exception handling, a bits count is performed on the second envelope signal, and the bit count value thereof is incremented.

In step 206, a target-channel signal is determined from the I-channel signal and the Q-channel signal, according to the first bit count value and the second bit count value, in a case that the first bit count value or the second bit count value reaches a preset bits threshold.

The embodiment illustrates more feasible channel selection mechanisms based on the embodiment shown in FIG. 1. In the embodiment shown in FIG. 1, the method for selecting a channel in the case of Ib>Qb+1 or Qb>Ib+1 is described. In practice, if Ib and Qb are positive integers, there may be the following three additional cases: Ib=Qb, Ib=Qb+1 or Ib+1=Qb.

Therefore, in this embodiment, in a case that Ib=Qb, Ib=Qb+1 or Ib+1=Qb, the target-channel signal may be determined according to an amplitude of the first reference point and an amplitude of the second reference point, that is, by comparing numerical values of EnvI(T1) and EnvQ(T2). If EnvI(T1) is larger, the I-channel signal may be selected as the target-channel signal. Conversely, if EnvQ(T2) is larger, the Q-channel signal may be selected as the target-channel signal.

Alternatively, in the case that Ib=Qb, Ib=Qb+1 or Ib+1=Qb, the target-channel signal may be determined according to a signal-to-noise ratio of the first reference point and a signal-to-noise ratio of the second reference point.

A signal-to-noise ratio at position T1 in the first envelope signal may be estimated with EnvI(T1), according to ISNR(T1)=EnvI(T1)/IN, where ISNR(T1) represents the signal-to-noise ratio at T1 in the first envelope signal, and IN represents a noise estimation for the I-channel signal. The noise estimation IN may be determined based on an envelope value of a signal received within a silent time period of the I-channel signal, that is, based on a signal received by the receiver within a frame delay time. This calculation process is well known in this field and is not repeated here.

Similarly, a signal-to-noise ratio at T2 in the second envelope signal may be estimated with EnvQ(T2), according to QSNR(T2)=EnvQ(T2)/QN, where QSNR(T2) represents the signal-to-noise ratio at T2 in the second envelope signal and QN represents a noise estimation for the Q-channel signal. The noise estimation QN may be determined based on an envelope value of a signal received within a silent time period of the Q-channel signal, that is, based on a signal received by the receiver within a frame delay time. The calculation process is well known in this field and is not repeated here.

By comparing ISNR(T1) with QSNR(T2), a target signal channel may be determined. If ISNR(T1) is larger, the I-channel signal may be selected as the target-channel signal. On the contrary, if QSNR(T2) is larger, the Q-channel signal may be selected as the target-channel signal.

Figure 3:
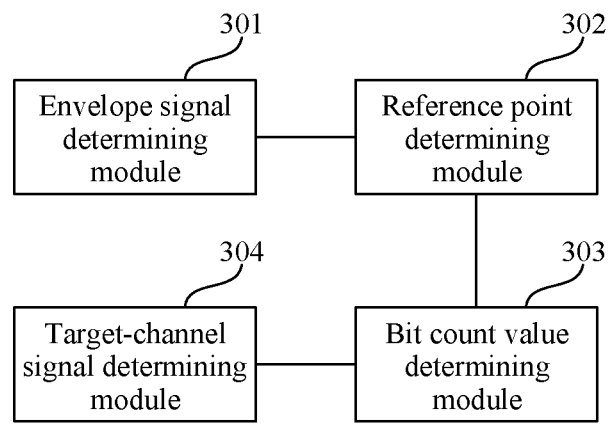
FIG. 3 is a structural diagram of an apparatus for selecting a channel of an NFC signal according to an embodiment of the present disclosure.

As shown in FIG. 3, an apparatus for selecting a channel of an NFC signal is provided according to the present disclosure. The apparatus according to this embodiment is a physical apparatus for performing the method illustrated in FIGS. 1 and 2. Reference may be made to the above method embodiments for detailed implementation of the apparatus as they share the same inventive idea. The apparatus according to the embodiment includes:

an envelope signal determining module 301, configured to determine a first envelope signal according to an I-channel signal in the NFC signal, and determine a second envelope signal according to a Q-channel signal in the NFC signal, a reference point determining module 302, configured to determine a first reference point and a first demodulation threshold corresponding to the first reference point according to the first envelope signal, and determine a second reference point and a second demodulation threshold corresponding to the second reference point according to the second envelope signal, a bit count value determining module 303, configured to perform a first bits count on the first envelope signal based on the first reference point and the first demodulation threshold to determine a first bit count value, and perform a second bits count on the second envelope signal based on the second reference point and the second demodulation threshold to determine a second bit count value, and a target-channel signal determining module 304, configured to determine a target-channel signal from the I-channel signal and the Q-channel signal according to the first bit count value and the second bit count value, in a case that the first bit count value or the second bit count value reaches a preset bits threshold.

In addition, in a preferable embodiment based on the embodiment shown in FIG. 3, the target-channel signal determining module 304 includes:

a first target-channel signal determining unit 341, configured to determine the I-channel signal as the target-channel signal in a case that Ib>Qb+1, or determine the Q-channel signal as the target-channel signal in a case that Qb>Ib+1, a second target-channel signal determining unit 342, configured to determine the target-channel signal according to an amplitude of the first reference point and an amplitude of the second reference point in a case that Ib=Qb, Ib=Qb+1 or Ib+1=Qb, and a third target-channel signal determining unit 343, configured to determine the target-channel signal according to a signal-to-noise ratio of the first reference point and a signal-to-noise ratio of the second reference point in a case that Ib=Qb, Ib=Qb+1 or Ib+1=Qb, where Ib represents the first bit count value, and Qb represents the second bit count value.

Figure 4:
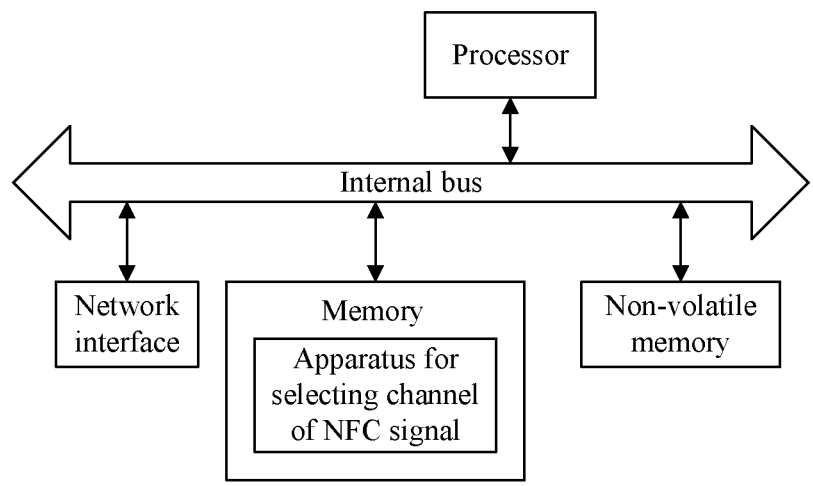
FIG. 4 is a structural diagram of an electronic device according to an embodiment of the present disclosure.

FIG. 4 is a structural diagram of an electronic device according to an embodiment of the present disclosure. On the hardware level, the electronic device includes a processor, and further includes an internal bus, a network interface and a memory in an embodiment. The memory may include an internal memory, such as a high-speed random-access memory (RAM), and may further include a non-volatile memory, such as at least one disk memory. The electronic device may also include hardware required by other services.

The processor, the network interface and the memory may be connected to each other through the internal bus, which may be an ISA (Industry Standard Architecture) bus, a PCI (Peripheral Component Interconnect) bus or an EISA (Extended Industry Standard Architecture) bus. The bus may include an address bus, a data bus, or a control bus. For ease of representation, the bus is illustrated by one bi-directional arrow in FIG. 4, which, however, does not mean that there is only one bus or one type of bus.

The memory stores executable instructions, and the execution instructions are a computer executable program. The memory may include an internal memory and a non-volatile memory, and provide the executable instructions and data to the processor.

In an embodiment, the processor reads the corresponding executable instructions from the non-volatile memory into the memory and then runs them. The processor may alternatively obtain the corresponding executable instructions from other devices, to form a device for selecting a channel of an NFC signals on logical level. The processor executes the executable instructions stored on the memory to perform the method for selecting a channel of an NFC signal according to any of the above embodiments of the present disclosure.

The method performed by the apparatus for selecting a channel of an NFC signal according to the embodiment shown in FIG. 3 of the present disclosure may be applied to the processor or implemented by the processor. The processor may be an integrated circuit chip with signal processing capability. In implementation, each step of the above method can be performed by a hardware integrated logic circuit in the processor or the instructions in the form of the software. The above processor may be a general-purpose processor, such as a Central Processing Unit (CPU), a Network Processor (NP), a Digital Signal Processors (DSP), an Application Specific Integrated Circuits (ASIC), a Field-Programmable Gate Array (FPGA) or any other programmable logic device, discrete gate, transistor logic device, or discrete hardware component, which can implement or perform the methods, steps and logic blocks in the embodiments according to the present disclosure. The general-purpose processor may be a microprocessor or any other conventional processor.

The steps of the methods according to the embodiments of the present disclosure may be directly implemented by a hardware decoding processor, or implemented by a combination of hardware and software modules in the decoding processor. The software module may be located in a mature storage medium in the field such as a random access memory, a flash memory, a read-only memory, a programmable read-only memory, an electrically erasable programmable memory, or a register. The storage medium is located in the memory, and the processor reads the information in the memory, and implements the steps of the above method in combination with its hardware.

A non-volatile computer readable storage medium with executable instructions stored thereon is further provided according to an embodiment of the present disclosure. The executable instructions, when executed by a processor of an electronic device, cause the electronic device to perform the method for selecting a channel of an NFC signal according to any of the above embodiments in the present disclosure, for example, the method shown in FIGS. 1 and 2.

The electronic service in the foregoing embodiments may be a computer.

Those skilled in the art should understand that the embodiments of the present disclosure may be provided as methods or computer program products. Therefore, the present disclosure may be implemented fully by hardware, fully by software or by a combination of hardware and software.

The embodiments of the present invention are described in a progressive manner, the same and similar parts of each embodiment can be referred to each other, and each embodiment focuses on the differences from other embodiments. In particular, as for the apparatus embodiment, since it is basically same as the method embodiment, the description is relatively simple, and for relevant parts, reference may be made to the description of the method embodiments.

Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The above are some embodiments of the present disclosure, which are not intended to limit the present disclosure. Various changes and modifications can be made by those skilled in the art. The substitutions, modifications or improvements within the scope of the spirit and principle of the present disclosure shall be included in the scope of the claims in the present disclosure.

The invention claimed is:

1. A method for selecting a channel of an NFC signal, the method comprising:
    determining a first envelope signal according to an I-channel signal in the NFC signal, and determining a second envelope signal according to a Q-channel signal in the NFC signal;
    determining a first reference point and a first demodulation threshold corresponding to the first reference point according to the first envelope signal;
    determining a second reference point and a second demodulation threshold corresponding to the second reference point according to the second envelope signal;
    performing a first bits count on the first envelope signal based on the first reference point and the first demodulation threshold to determine a first bit count value;

performing a second bits count on the second envelope signal based on the second reference point and the second demodulation threshold to determine a second bit count value; and determining a target-channel signal from the I-channel signal and the Q-channel signal, according to the first bit count value and the second bit count value, in a case that the first bit count value or the second bit count value reaches a preset bits threshold.

2. The method according to claim 1, wherein determining the first reference point according to the first envelope signal and determining the second reference point according to the second envelope signal comprise:

determining EnvI(T1) as an amplitude of the first reference point in a case that EnvI(T1)≥EnvI(T1+1), EnvI(T1)>EnvI(T1+2), EnvI(T1)>EnvI(T1+3) and EnvI(T1)>THIsoc, wherein EnvI represents the first envelope signal, T1 represents a time instant T1 in the first envelope signal, and THIsoc represents a preset first detection threshold; and determining EnvQ(T2) as an amplitude of the second reference point in a case that EnvQ(T2)≥EnvQ(T2+1), EnvQ(T2)>EnvQ(T2+2), EnvQ(T2)>EnvQ(T2+3) and EnvQ(T2)>THQsoc, wherein EnvQ represents the second envelope signal, T2 represents a time instant T2 in the second envelope signal, and THQsoc represents a preset second detection threshold.

3. The method according to claim 2, wherein determining the first demodulation threshold corresponding to the first reference point and determining the second demodulation threshold corresponding to the second reference point comprise:

determining IThm=α*EnvI(T1) and QThm=α*EnvQ(T2), wherein IThm represents the first demodulation threshold, QThm represents the second demodulation threshold, and α represents a preset demodulation coefficient; and determining IThe=β*EnvI(T1) and QThe=β*EnvQ(T2), wherein IThe represents a first amplitude threshold, QThe represents a second amplitude threshold, and β represents a preset amplitude coefficient.

4. The method according to claim 3, wherein performing the first bits count on the first envelope signal based on the first reference point and the first demodulation threshold to determine the first bit count value comprises:

performing a loop count on the first envelope signal based on the first reference point;

determining a first sampling amplitude and a second sampling amplitude of the first envelope signal according to the loop count; and incrementing the first bit count value of the first envelope signal once, in a case that an absolute value of a difference between the first sampling amplitude and the second sampling amplitude is greater than the first demodulation threshold and the first sampling amplitude or the second sampling amplitude is greater than the first amplitude threshold.

5. The method according to claim 4, wherein performing the second bits count on the second envelope signal based on the second reference point and the second demodulation threshold to determine the second bit count value comprises:

performing a loop count on the second envelope signal based on the second reference point;

determining a third sampling amplitude and a fourth sampling amplitude of the second envelope signal according to the loop count; and incrementing the second bit count value of the second envelope signal once, in a case that an absolute value of a difference between the third sampling amplitude and the fourth sampling amplitude is greater than the second demodulation threshold and the third sampling amplitude or the fourth sampling amplitude is greater than the second amplitude threshold.

6. The method according to claim 2, wherein determining the target-channel signal from the I-channel signal and the Q-channel signal according to the first bit count value and the second bit count value comprises:

determining the I-channel signal as the target-channel signal in a case that Ib>Qb+1; and determining the Q-channel signal as the target-channel signal in a case that Qb>Ib+1, wherein Ib represents the first bit count value, and Qb represents the second bit count value.

7. The method according to claim 6, wherein determining the target-channel signal from the I-channel signal and the Q-channel signal according to the first bit count value and the second bit count value comprises:

determining the target-channel signal according to the amplitude of the first reference point and the amplitude of the second reference point, in a case that Ib=Qb, Ib=Qb+1 or Ib+1=Qb.

8. The method according to claim 6, wherein determining the target-channel signal from the I-channel signal and the Q-channel signal according to the first bit count value and the second bit count value comprises:

determining the target-channel signal according to a signal-to-noise ratio of the first reference point and a signal-to-noise ratio of the second reference point, in a case that Ib=Qb, Ib=Qb+1 or Ib+1=Qb.

9. The method according to claim 1, wherein determining the target-channel signal from the I-channel signal and the Q-channel signal according to the first bit count value and the second bit count value comprises:

determining the I-channel signal as the target-channel signal in a case that Ib>Qb+1; and determining the Q-channel signal as the target-channel signal in a case that Qb>Ib+1, wherein Ib represents the first bit count value, and Qb represents the second bit count value.

10. An electronic device, comprising a processor and a memory with executable instruction stored thereon, wherein the processor is configured to execute the executable instructions to perform the following operations:

determining a first envelope signal according to an I-channel signal in the NFC signal, and determining a second envelope signal according to a Q-channel signal in the NFC signal;

determining a first reference point and a first demodulation threshold corresponding to the first reference point according to the first envelope signal;

determining a second reference point and a second demodulation threshold corresponding to the second reference point according to the second envelope signal;

performing a first bits count on the first envelope signal based on the first reference point and the first demodulation threshold to determine a first bit count value;

performing a second bits count on the second envelope signal based on the second reference point and the second demodulation threshold to determine a second bit count value; and determining a target-channel signal from the I-channel signal and the Q-channel signal, according to the first bit count value and the second bit count value, in a case that the first bit count value or the second bit count value reaches a preset bits threshold.

11. The electronic device according to claim 10, where determining the first reference point according to the first envelope signal and determining the second reference point according to the second envelope signal comprise:
   determining EnvI(T1) as an amplitude of the first reference point in a case that EnvI(T1)≥EnvI(T1+1), EnvI(T1)>EnvI(T1+2), EnvI(T1)>EnvI(T1+3) and EnvI(T1)>THIsoc, wherein EnvI represents the first envelope signal, T1 represents a time instant T1 in the first envelope signal, and THIsoc represents a preset first detection threshold; and
   determining EnvQ(T2) as an amplitude of the second reference point in a case that EnvQ(T2)≥EnvQ(T2+1), EnvQ(T2)>EnvQ(T2+2), EnvQ(T2)>EnvQ(T2+3) and EnvQ(T2)>THQsoc, wherein EnvQ represents the second envelope signal, T2 represents a time instant T2 in the second envelope signal, and THQsoc represents a preset second detection threshold.

12. The electronic device according to claim 11, wherein determining the first demodulation threshold corresponding to the first reference point and determining the second demodulation threshold corresponding to the second reference point comprise:
   determining IThm=α*EnvI(T1) and QThm=α*EnvQ(T2), wherein IThm represents the first demodulation threshold, QThm represents the second demodulation threshold, and α represents a preset demodulation coefficient; and
   determining IThe=β*EnvI(T1) and QThe=β*EnvQ(T2), wherein IThe represents a first amplitude threshold, QThe represents a second amplitude threshold, and β represents a preset amplitude coefficient.

13. The electronic device according to claim 12, wherein performing the first bits count on the first envelope signal based on the first reference point and the first demodulation threshold to determine the first bit count value comprises:
   performing a loop count on the first envelope signal based on the first reference point;
   determining a first sampling amplitude and a second sampling amplitude of the first envelope signal according to the loop count; and
   incrementing the first bit count value of the first envelope signal once, in a case that an absolute value of a difference between the first sampling amplitude and the second sampling amplitude is greater than the first demodulation threshold and the first sampling amplitude or the second sampling amplitude is greater than the first amplitude threshold.

14. The electronic device according to claim 13, wherein performing the second bits count on the second envelope signal based on the second reference point and the second demodulation threshold to determine the second bit count value comprises:
   performing a loop count on the second envelope signal based on the second reference point;
   determining a third sampling amplitude and a fourth sampling amplitude of the second envelope signal according to the loop count; and
   incrementing the second bit count value of the second envelope signal once, in a case that an absolute value of a difference between the third sampling amplitude and the fourth sampling amplitude is greater than the second demodulation threshold and the third sampling amplitude or the fourth sampling amplitude is greater than the second amplitude threshold.

15. The electronic device according to claim 11, wherein determining the target-channel signal from the I-channel signal and the Q-channel signal according to the first bit count value and the second bit count value comprises:
   determining the I-channel signal as the target-channel signal in a case that Ib>Qb+1; and
   determining the Q-channel signal as the target-channel signal in a case that Qb>Ib+1,
   wherein Ib represents the first bit count value, and Qb represents the second bit count value.

16. The electronic device according to claim 15, wherein determining the target-channel signal from the I-channel signal and the Q-channel signal according to the first bit count value and the second bit count value comprises:
   determining the target-channel signal according to the amplitude of the first reference point and the amplitude of the second reference point, in a case that Ib=Qb, Ib=Qb+1 or Ib+1=Qb.

17. The electronic device according to claim 15, wherein determining the target-channel signal from the I-channel signal and the Q-channel signal according to the first bit count value and the second bit count value comprises:
   determining the target-channel signal according to a signal-to-noise ratio of the first reference point and a signal-to-noise ratio of the second reference point, in a case that Ib=Qb, Ib=Qb+1 or Ib+1=Qb.

18. The electronic device according to claim 10, wherein determining the target-channel signal from the I-channel signal and the Q-channel signal according to the first bit count value and the second bit count value comprises:
   determining the I-channel signal as the target-channel signal in a case that Ib>Qb+1; and
   determining the Q-channel signal as the target-channel signal in a case that Qb>Ib+1,
   wherein Ib represents the first bit count value, and Qb represents the second bit count value.

19. A non-transitory computer readable storage medium with executable instructions stored thereon, wherein the executable instructions, when executed by a processor, cause the processor to perform the following operations:
   determining a first envelope signal according to an I-channel signal in the NFC signal, and determining a second envelope signal according to a Q-channel signal in the NFC signal;
   determining a first reference point and a first demodulation threshold corresponding to the first reference point according to the first envelope signal;
   determining a second reference point and a second demodulation threshold corresponding to the second reference point according to the second envelope signal;
   performing a first bits count on the first envelope signal based on the first reference point and the first demodulation threshold to determine a first bit count value;
   performing a second bits count on the second envelope signal based on the second reference point and the second demodulation threshold to determine a second bit count value; and
   determining a target-channel signal from the I-channel signal and the Q-channel signal, according to the first bit count value and the second bit count value, in a case that the first bit count value or the second bit count value reaches a preset bits threshold.

* * * * *